(12) United States Patent
Suzuki

(10) Patent No.: US 8,945,775 B2
(45) Date of Patent: Feb. 3, 2015

(54) BATTERY HAVING A POROUS INSULATING MEMBER

(75) Inventor: Satoshi Suzuki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 484 days.

(21) Appl. No.: 12/996,789

(22) PCT Filed: May 11, 2009

(86) PCT No.: PCT/JP2009/058754
§ 371 (c)(1),
(2), (4) Date: Dec. 8, 2010

(87) PCT Pub. No.: WO2009/150912
PCT Pub. Date: Dec. 17, 2009

(65) Prior Publication Data
US 2011/0086265 A1    Apr. 14, 2011

(30) Foreign Application Priority Data

Jun. 13, 2008    (JP) .................................. 2008-155596

(51) Int. Cl.
| | |
|---|---|
| *H01M 2/10* | (2006.01) |
| *H01M 2/00* | (2006.01) |
| *H01M 2/16* | (2006.01) |
| *H01M 2/36* | (2006.01) |
| *H01M 2/02* | (2006.01) |

(52) U.S. Cl.
CPC .............. *H01M 2/361* (2013.01); *H01M 2/028* (2013.01); *H01M 2/022* (2013.01); *H01M 2/0267* (2013.01); *H01M 2/0275* (2013.01); *H01M 2/0277* (2013.01); *H01M 2002/0297* (2013.01); *Y02E 60/122* (2013.01)
USPC ........................... 429/246; 429/163; 429/186

(58) Field of Classification Search
USPC ......................................... 429/139, 136, 167
See application file for complete search history.

(56) References Cited

U.S. PATENT DOCUMENTS 5,922,492 A * 7/1999 Takita et al. .................. 429/249

FOREIGN PATENT DOCUMENTS

| CN | 2772034 | 4/2006 |
|---|---|---|
| JP | 4-167356 | 6/1992 |

(Continued)

OTHER PUBLICATIONS

JPO Machine Translation of JP 2003-059537 A.*

(Continued)

*Primary Examiner* — Barbara Gilliam
*Assistant Examiner* — Robert S Carrico
(74) *Attorney, Agent, or Firm* — Finnegan, Henderson, Farabow, Garrett & Dunner, LLP

(57) ABSTRACT

A main object of the present application is to provide a battery including an insulating member that insulates a battery case from an electrode body and is able to secure good injection performance of an electrolyte solution. The battery provided by the present application includes an electrode body provided with a positive electrode and a negative electrode, and a battery case that houses the electrode body together with an electrolyte solution. An insulating member that isolates the electrode body from the battery case is arranged between the electrode body and the battery case, and the insulating member is formed into a bag shape that encloses the electrode body and is made of a porous material having pores through which the electrolyte solution is able to flow.

7 Claims, 4 Drawing Sheets

(56) References Cited

FOREIGN PATENT DOCUMENTS

| | | | | |
|---|---|---|---|---|
| JP | 09147902 A | * | 6/1997 | |
| JP | 2000-7819 | | 1/2000 | |
| JP | 2000-12097 | | 1/2000 | |
| JP | 2000-260413 | | 9/2000 | |
| JP | 2000-315489 | | 11/2000 | |
| JP | 2001-35472 | | 2/2001 | |
| JP | 2001-266950 | | 9/2001 | |
| JP | 2001266950 A | * | 9/2001 | |
| JP | 2002198099 A | * | 7/2002 | |
| JP | 2003-7340 | | 1/2003 | |
| JP | 2003-59537 | | 2/2003 | |
| JP | 2003223933 A | * | 8/2003 | |
| JP | 2005-294150 | | 10/2005 | |

OTHER PUBLICATIONS

JPO Machine Translation of JP 2005-294150 A.*
JPO Machine Translation of JP 2001-266950 A.*
JP 2002198099 A Machine Translation.*
IDPL Machine Translation of JP 09147902 A.*
Translation of JP 2005-294150 A.*
International Search Report in International Application No. PCT/JP2009/058754; Mailing Date: Jun. 9, 2009.

* cited by examiner

BATTERY HAVING A POROUS INSULATING MEMBER

TECHNICAL FIELD

The present invention relates to a battery, and more particularly to a battery provided with an insulating member that insulates a battery case and an electrode body.

This application is a national phase application of International Application No. PCT/JP2009/058754, filed May 11, 2009, and claims the priority of Japanese Application No. 2008-155596, filed Jun 13, 2008, the contents of both of which are incorporated herein by reference.

BACKGROUND ART

In recent years, lithium ion batteries, nickel hydrogen batteries and other secondary batteries have become increasingly important as vehicle-mounted power supplies or power supplies of personal computers and other portable terminals. In particular, lithium ion batteries, which are lightweight and allow the obtaining of a high energy density, are expected to be preferably used as vehicle-mounted, high-output power supplies. In this type of battery, a battery structure is known that is provided with a wound electrode body in which a sheet-like positive electrode and a sheet-like negative electrode are laminated and wound with a separator.

However, in this type of battery, it is necessary to produce the electrode body and the battery case (namely, the external container) separately followed by housing the electrode body in the battery case. Metal packages are frequently used for the battery case, and in such cases, it is necessary to package the electrode body in an insulating film to insulate the metal package from the electrode body. For example, Patent Document 1 discloses a configuration of a secondary battery in which an electrode group is inserted into an insulating member in which a polyimide thin film having a thickness of 50 μm is formed into a bag shape to electrically insulate the electrode group from a battery case. Furthermore, another example of a patent document is Patent Document 2.

Patent Document 1: Japanese Patent Application Laid-open No. 2003-59537

Patent Document 2: Japanese Patent Application Laid-open No. 2003-7340

However, when the periphery of an electrode group is covered by an insulating member in the shape of a bag as described in Patent Document 1, an electrolyte solution is unable to pass through insulating member when injecting electrolyte solution, thereby resulting in the risk of impairing permeation of the electrolyte solution into the electrode group. As a result, uneven permeation into the electrode group occurs easily. In addition, since convection flow of electrolyte solution is impaired by the insulating member, a long period of time is required for the electrolyte solution to permeate into the entire electrode group, thereby resulting in the risk of poor battery productivity.

DISCLOSURE OF THE INVENTION

With the foregoing in view, a main object of the present invention is to provide a battery including an insulating member capable of insulating a battery case and an electrode body while also being able to secure good injection performance of an electrolyte solution.

The battery provided by the present invention includes an electrode body provided with a positive electrode and a negative electrode, and a battery case that houses the electrode body together with an electrolyte solution. An insulating member that isolates the electrode body from the battery case is arranged between the electrode body and the battery case. The insulating member is formed into a bag shape that encloses the electrode body and is made of a porous material having pores through which the electrolyte solution is able to flow.

According to the configuration of the present invention, since an insulating member that isolates an electrode body from a battery case is made of a porous material, it is able to impart permeability to the insulating member that allows the electrolyte solution and the like to pass therethrough. As a result, the electrolyte solution is allowed to flow (convection flow) through the pores in the insulating member during injection of electrolyte solution, thereby enabling the electrolyte solution to rapidly permeate into the entire electrode body. As a result, injection performance of the electrolyte solution is improved, the occurrence of uneven permeation of electrolyte solution can be inhibited, and battery productivity becomes good.

Moreover, the pores of the insulating member can also be used as pores for venting gas. Namely, gas generated from the electrode body when an abnormality has occurred in the battery can be smoothly released to the outside of the electrode body through the pores of the insulating member. According to such a configuration, retention of gas generated from the electrode body within the insulating member (entrapment of gas within the bag-like insulating member) can be avoided. As a result, a battery can be provided that has superior safety.

Furthermore, the porous material that composes the bag-like insulating member has a large number of pores, and is composed so that continuity can be established between the outside and inside of the bag-like insulating member by these separate pores (or by connections among the large number of pores). There are no particular limitations on the shape of the pores provided they allow the electrolyte solution to flow therethrough. For example, the pores may be in the shape of slits, cylinders or spheres.

In addition, the porous material that composes the bag-like insulating member is preferably a material that has insulating properties and is resistant to electrolyte solution (and particularly resistance to corrosion by electrolyte solution). A porous resin material is an example of such a porous material. For example, polyethylene (PE), polypropylene (PP), polytetrafluoroethylene (PTFE), polyphenylene sulfide (PPS) or a combination thereof can be used preferably. Porous resin materials have mechanical strength and chemical stability to a degree that is suitable for the object of the present invention, and can be procured at low cost.

In a preferable aspect of a battery disclosed herein, the electrode body is provided with a separator interposed between the positive and negative electrodes. In this case, an average pore diameter of the insulating member (average pore diameter) is preferably less than a thickness of the separator. The average value of the pores formed in the insulating member (average pore diameter) is obtained according to, for example, the bubble point method (JIS K 3832 or JIS B 8356-2). Measurement of pore diameter based on the bubble point method (average pore diameter or pore diameter distribution) can be easily carried out using, for example, a commercially available Porometer 3G system manufactured by BEL Japan, Inc.

According to the configuration described above, a situation in which foreign objects larger than the thickness of the separator (such as welding spatter that can be generated when sealing the battery case) enter the bag-like insulating member through the insulating member can be avoided. If foreign objects larger than the thickness of the separator (and particularly electrically conductive foreign objects) enter the bag-like insulating member, the foreign objects can enter the electrode body (and typically through a gap between the separator and either the positive electrode or negative electrode) accompanying expansion and contraction of the electrode body caused by charging and discharging, for example, pass through (pierce) the separator, and cause an internal short-circuit in the electrode body as a result of the penetrating foreign objects forming a bridge between the positive and negative electrodes. In contrast, according to the configuration described above, since the insulating member can be imparted with the function of a filter for the above-mentioned foreign objects, entry of the foreign objects into the insulating member (and eventually into the electrode body) can be avoided. As a result, internal short-circuiting of the electrode body can be prevented more reliably.

In a preferable aspect of the battery disclosed herein, the separator is a porous separator. In this case, the average pore diameter of the insulating member is preferably larger than an average pore diameter of the porous separator. If the pore diameter (pore diameter distribution) of the insulating member is excessively small, suitable electrolyte solution permeability cannot be imparted to the insulating member, thereby impairing injection performance of the electrolyte solution or causing gas generated during a battery abnormality to be retained within the insulating member, thereby making this undesirable.

In contrast, according to the configuration of the present invention, since the average pore diameter of the insulating member is larger than the average pore diameter of the porous separator, adequate permeability of electrolyte solution and the like into the insulating member can be secured. Furthermore, an example of a preferable range for the average pore diameter of the insulating member (based on the above-mentioned measurement method) is 0.1 µm to 25 µm. As a result of making the average pore diameter to be within this range, suitable electrolyte solution permeability can be imparted to the insulating member while also being able to prevent internal short-circuiting of the electrode body by blocking the entry of foreign objects into the insulating member.

In a preferable aspect of the battery disclosed herein, the insulating member is formed so as to be able to cover the entire electrode body. As a result of completely covering the entire electrode body so that the electrode body enclosed by the insulating member is not exposed outside the insulating member, contamination of the electrode body by foreign objects (and particularly electrically conductive foreign objects larger than the thickness of the separator) can be more reliably prevented.

BEST MODE FOR CARRYING OUT THE INVENTION

In the present description, a "battery" refers to a power storage device enabling the extraction of a prescribed electrical energy, and is not limited to a specific storage mechanism (configuration consisting of an electrode body and electrolyte). A lithium secondary battery such as a lithium ion battery, a nickel hydrogen secondary battery and other secondary batteries or capacitors such as an electric double-layer capacitor (namely, a physical battery) are typical examples included in the battery as referred to here.

In addition, in the present description, an "electrode body" refers to a structure that at least includes one each of a positive electrode and a negative electrode, and constitutes the main body of a battery (power storage device).

The following provides an explanation of embodiments according to the present invention with reference to the drawings. In the following drawings, those members and sites demonstrating the same actions are explained using the same reference numbers. Furthermore, although the following provides a detailed explanation of the structure of the battery of the present invention using the example of a rectangular lithium ion secondary battery 100, the present invention is not intended to be limited to that described in the embodiments. In addition, the dimensional relationships in each drawing (length, width, thickness and the like) do not reflect actual dimensional relationships.

Figure 1A:
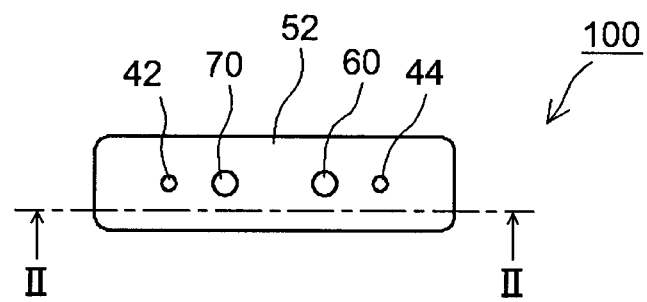
FIG. 1A is an overhead view schematically showing the appearance of a lithium ion secondary battery relating to an embodiment of the present invention.
Figure 1B:
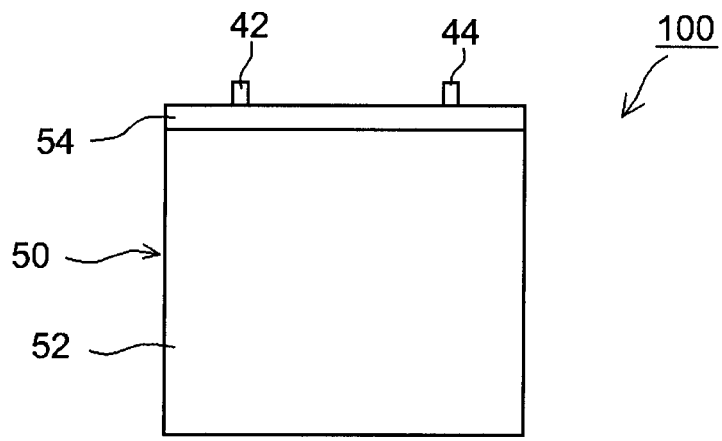
FIG. 1B is a front view schematically showing the appearance of a lithium ion secondary battery relating to an embodiment of the present invention.

The following provides an explanation of the configuration of a battery 100 with reference to FIGS. 1A and 1B. FIG. 1A is an overhead view schematically showing the appearance of a lithium ion secondary battery relating to the present embodiment, while FIG. 1B is a front view thereof. As shown in FIGS. 1A and 1B, the lithium ion secondary battery 100 disclosed herein is provided with an electrode body 80 provided with a positive electrode 82 and a negative electrode 84 (FIG. 2), and a battery case 50 that houses the electrode body 80.

Figure 2:
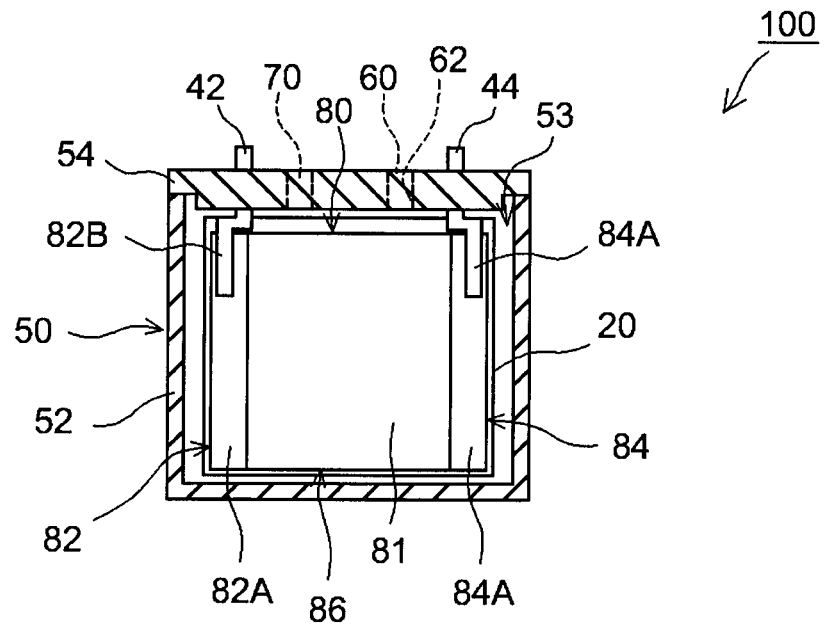
FIG. 2 is a cross-sectional view schematically showing a cross-section II-II of FIG. 1A.

The battery case 50 is formed from a battery case body 52 and a cover 54. The battery case body 52 has a shape that allows it to house the electrode body 80 (FIG. 2). In this embodiment, the battery case body 52 has a box-like shape that is able to house the flat electrode body 80. The battery case body 52 has an upper open end 53, and is composed so as to enable the electrode body 80 to be housed by inserting through the upper open end 53. The cover 54 is a member that covers the upper open end 53 of the battery case body 52, and in this embodiment, preferably uses a roughly rectangular plate-like member. The material of the battery case body 52 and the cover 54 is preferably a lightweight metal material having good thermal conductivity, and examples of materials that can be used include aluminum, stainless steel and nickel-plated steel.

A safety valve 70 is provided on the upper surface of the cover 54 in the same manner as a conventional battery case. The safety valve 70 is composed so that the valve body (not shown) deforms for safety reasons when the pressure inside the battery case 50 becomes abnormally high, and releases gas and the like inside from a gap formed between the valve body and the cover 54. Moreover, a liquid injection port 62 is provided in the upper surface of the cover 54. The liquid injection port 62 enables electrolyte solution to be housed within the battery case 50 through the liquid injection port 62, and is normally sealed by a sealing plug 60. A non-aqueous electrolyte solution, in which an electrolyte is dissolved in a non-aqueous solvent, for example, can be used for the electrolyte solution able to be housed in the battery case 50. In this embodiment, a mixed solvent of diethyl carbonate and ethylene carbonate (mixed at a weight ratio of, for example, 1:1) is used for the non-aqueous solvent, lithium hexafluorophosphate ($LiPF_6$) is used for the electrolyte, and the concentration thereof is adjusted to about 1 mol/liter.

Figure 3:
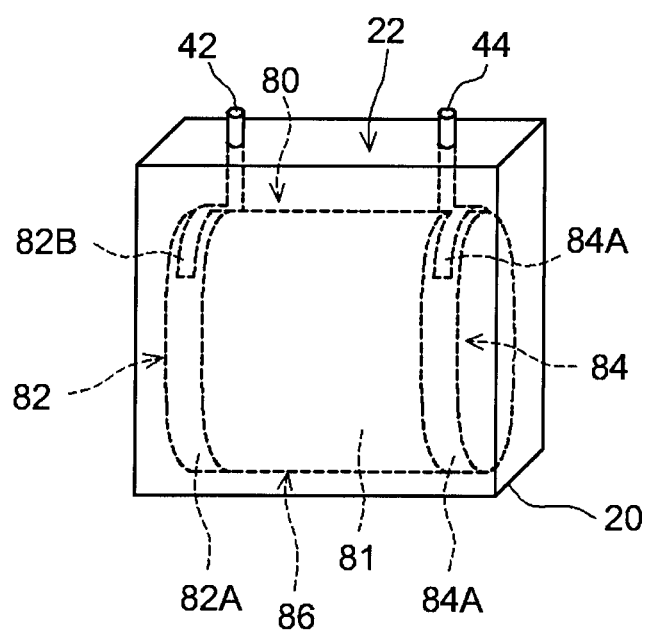
FIG. 3 is an external perspective view schematically showing the positional relationship between an electrode body and an insulating member in an embodiment of the present invention.

Next, an explanation is provided of the internal structure of the battery 100 relating to the present embodiment with reference to FIGS. 2 and 3. FIG. 2 is a cross-sectional view schematically showing a cross-section II-II of FIG. 1A, while FIG. 3 is an external perspective view schematically showing the positional relationship between the electrode body 80 and an insulating member 20.

The electrode body 80 is housed in the battery case 50 together with the above-mentioned electrolyte solution. The electrode body 80 is provided with the positive electrode 82, the negative electrode 84 and a separator 86 interposed between the positive and negative electrodes in the same manner as an electrode body of an ordinary lithium ion battery. In this embodiment, the electrode body 80 is a flat, wound electrode body 80 that is produced by laminating the positive electrode sheet 82 and the negative electrode sheet 84 together with a total of two separator sheets 86, winding the positive electrode sheet 82 and the negative electrode sheet 84 while slightly shifting out of position, and flattening the resulting wound body by compressing from the lateral directions.

As a result of being wound while slightly shifting out of position in the horizontal direction with respect to direction of winding of the wound electrode body 80, a portion of the ends of the positive electrode sheet 82 and the negative electrode sheet 84 are each protruding to the outside from a winding core 81 (namely, the portion around which a positive electrode active material layer forming portion of the positive electrode sheet 82, a negative electrode active material layer forming portion of the negative electrode sheet 84, and the separator sheet 86 are tightly wound). A positive electrode lead terminal 82B and a negative electrode lead terminal 84B are respectively attached to a positive electrode side protruding portion (namely, the portion where the positive electrode active material layer is not formed) 82A and a negative electrode side protruding portion (namely, the portion where the negative electrode active material layer is not formed) 84A, and a positive electrode terminal 42 and a negative electrode terminal 44 are respectively electrically connected thereto. In this embodiment, the positive electrode terminal 42 and the negative electrode terminal 44 are respectively attached to the cover 54 of the battery case 50 through a gasket (not shown).

There are no particular limitations on the materials and members per se that compose the wound electrode body 80 and may be similar to those of an electrode body of a conventional lithium ion battery. For example, the positive electrode 82 is formed by applying a positive electrode active material layer for a lithium ion battery onto a long positive electrode current collector (aluminum foil in this embodiment). On the other hand, the negative electrode sheet 84 is formed by applying a negative electrode active material layer for a lithium ion battery onto a long negative electrode current collector (copper foil in this embodiment). In addition, an example of a preferable separator 86 interposed between the positive electrode sheet 82 and the negative electrode sheet 84 is the one made of a porous polyolefin-based resin. For example, a porous separator sheet made of a synthetic resin (such as that made of a polyolefin such as polyethylene) having a thickness of 5 to 30 μm (25 μm in this embodiment) and an average pore diameter of about 0.1 μm can be used preferably.

The insulating member 20, which isolates the electrode body 80 and the battery case 50, is arranged between the electrode body 80 and the battery case 50. The insulating member 20 is formed into a bag shape that encloses (and preferably envelops) the electrode body 80 as shown in FIG. 3. In this embodiment, the insulating member 20 has the shape of a bottomed box of which the upper end thereof is open, and is able to house the flat electrode body 80 by passing through the upper open end 22. In addition, the insulating member 20 is composed so as to completely cover those portions of the flat electrode body 80 other than the upper surface (namely, the bottom and sides). As a result of interposing the bag-like insulating member 20 in this manner, direct contact between the flat electrode body 80, which serves as the power generating element, and the battery case 50 is avoided, thereby making it possible to provide electrical insulation between the flat electrode body 80 and the battery case 50. Although there are no particular limitations on the thickness of the bag-like insulating member 20 provided it allows the obtaining of required strength, it is, for example, about 0.1 mm.

The insulating member 20 is made of a porous material having pores (not shown) through which the above-mentioned electrolyte solution is able to flow. The porous material that composes the insulating member 20 has a large number of pores, and is composed so that continuity can be established between the outside and inside of the bag-like insulating member 20 by these separate pores (or by connections among the large number of pores). There are no particular limitations on the shape of the pores provided they allow the electrolyte solution to flow therethrough. For example, the pores may be in the shape of slits, cylinders or spheres. The porous material that composes the insulating member is preferably a material that has insulating properties and is resistant to electrolyte solution (and particularly resistance to corrosion by electrolyte solution). A porous resin material is an example of such a porous material. For example, polyethylene (PE), polypropylene (PP), polytetrafluoroethylene (PTFE), polyphenylene sulfide (PPS) or a combination thereof can be used preferably. Porous resin materials have mechanical strength and chemical stability to a degree that is suitable for the object of the present invention, and can be procured at low cost. Furthermore, the conversion of such a resin material to a porous material can be carried out by, for example, applying a known baking method to a powdered resin material.

Figure 4:
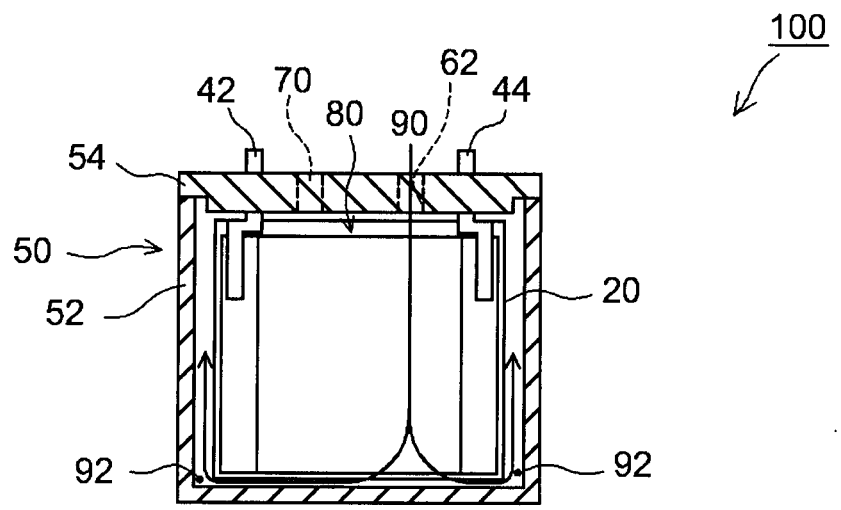
FIG. 4 is a schematic drawing for explaining the flow of electrolyte solution injected into a battery case relating to an embodiment of the present invention.

According to the above-mentioned configuration, since the bag-like insulating member 20 that isolates the electrode body 80 and the battery case 50 is made of a porous material, it is able to impart permeability that allows electrolyte solution and the like to pass through the bag-like insulating member 20. As a result, electrolyte solution is able to move (convection flow) through the pores of the bag-like insulating member 20 when injecting electrolyte solution, thereby enabling electrolyte solution to rapidly permeate to the entire electrode body 80. For example, in this embodiment as shown in FIG. 4, when electrolyte solution is injected through the liquid injection port 62 of the cover 54, the injected electrolyte solution (arrow "90") flows (convection flows) through the inside of the battery case 50 by passing through the pores in the bag-like insulating member 20, and also surrounds the outside of the electrode body 80 without being impaired by the insulating member 20. Consequently, the electrolyte solution is able to rapidly (in a short period of time) permeate the entire electrode body 80. As a result, injection performance of the electrolyte solution is improved, and together with being able to suppress the occurrence of uneven permeation of electrolyte solution, battery productivity becomes good.

Moreover, the pores of the insulating member 20 can also be used as pores for venting gas. Namely, gas that has been generated from the electrode body 80 when an abnormality has occurred in the battery can be smoothly released outside the electrode body 80 through the pores of the insulating member 20. According to such a configuration, retention of gas generated from the electrode body 80 within the insulating member 20 (entrapment of gas within the bag-like insulating member) can be avoided. As a result, the battery 100 can be provided having superior safety.

Here, the average pore diameter of the insulating member 20 is preferably larger than the average pore diameter of the porous separator 86. This is because, since it becomes difficult for electrolyte solution and the like to pass through the pores of the insulating member 20 if the pore diameter of the insulating member 20 is too small, suitable electrolyte solution permeability is unable to be imparted to the insulating member 20 causing injection performance of the electrolyte solution to be impaired, or gas generated during an abnormality in the battery is retained within the insulating member 20.

Figure 5:
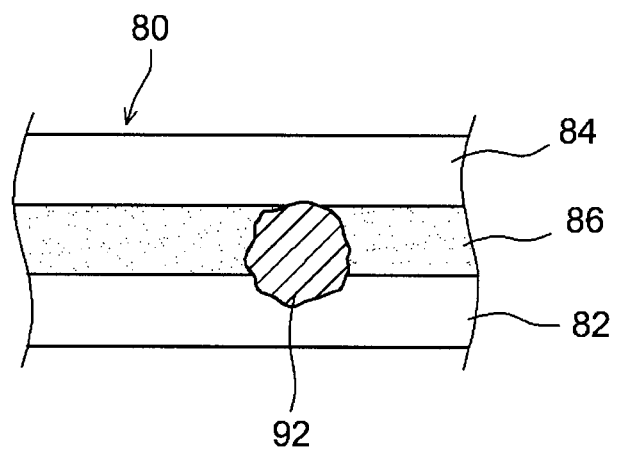
FIG. 5 is a schematic drawing for graphically explaining internal short-circuiting of an electrode body caused by foreign object contamination relating to an embodiment of the present invention.

In addition, the average pore diameter of the insulating member 20 is preferably less than the thickness of the porous separator 86 provided by the electrode body 80. For example, an average pore diameter that is about one-half the thickness of the porous separator 86 is suitable. As shown in FIG. 4, when electrolyte solution is injected through the liquid injection port 62 of the cover 54, the injected electrolyte solution (arrow "90") moves (convection flows) within the battery case 50 by passing through the pores of the insulating member 20. At this time, if an electrically conductive foreign object 92 is adhered to the inner surface of the battery case 50 (such as welding spatter that can be generated when joining the battery case body 52 and the cover 54 or minute metal particles that have adhered to the inner surface of the battery case 50), there is the risk of the adhered electrically conductive foreign object 92 passing through the pores of the bag-like insulating member 20 together with the electrolyte solution and penetrating inside the bag-like insulating member 20. If the electrically conductive foreign object 92 penetrates into the insulating member 20 together with the electrolyte solution in this manner, the penetrated foreign object 92 enters the electrode body 80 (typically through a gap between the separator sheet 86 and the positive and negative electrode sheets 82 and 84) accompanying expansion and contraction of the electrode body 80 caused by charging and discharging. In the case this entered foreign object 92 is larger than the thickness of the separator sheet 86, the foreign object 92 passes through (pierces) the separator sheet 86 in the direction of thickness as shown in FIG. 5, thereby enabling the penetrated foreign object 92 to cause an internal short-circuit within the electrode body 80 as a result of forming a bridge between the positive and negative electrode sheets 82 and 84.

In contrast, in the present embodiment, since the average pore diameter of the insulating member 20 is made to be less than the thickness of the separator 86, the function of a filter for the foreign object (foreign object larger than the thickness of the separator 86) 92 can be imparted to the insulating member 20, and the entrance of the foreign object 92 into the insulating member 20 through the pores of the insulating member 20 can be avoided. Consequently, internal short-circuiting of the electrode body 80 can be prevented. Furthermore, although there are cases in which a foreign object smaller than the average pore diameter of the porous separator sheet 86 (such as a foreign object having a diameter of less than 0.1 μm) may enter the bag of the insulating member 20, foreign objects of such a small size do not pass through the separator sheet 86 even if they have entered the electrode body 80, and cannot cause internal short-circuiting of the electrode body 80.

An example of a preferable range of the average pore diameter of the insulating member 20 is a range of roughly 0.1 μm to 25 μm and preferably, for example, a range of 0.1 μm to 15 μm. As a result of making the average pore diameter to be within such a range, suitable electrolyte solution permeability can be imparted to the insulating member 20 while also being able to prevent internal short-circuiting of the electrode body 80 by blocking the entry of foreign objects into the insulating member 20.

The following experiment was carried out as an example in order to confirm that uneven permeation of electrolyte solution can be suppressed and elimination of contamination by foreign objects of a prescribed size can be realized by constructing a battery using the insulating member 20 relating to the present embodiment. Namely, the positive electrode sheet 82 (having a thickness of about 100 μm), in which a positive electrode active material layer for a lithium ion battery was formed on the surface of an aluminum foil as a positive electrode current collector, and the negative electrode sheet 84 (having a thickness of about 100 μm), in which a negative electrode active material layer for a lithium ion battery was formed on the surface of a copper foil as a negative electrode current collector, were wound with two porous separator sheets (having a thickness of 25 μm and a pore diameter of about 0.1 μm) interposed there between followed by compressing the resulting wound body from the lateral directions to produce the flat, wound electrode body 80. The wound electrode body 80 obtained in this manner was inserted into the bag-like insulating member 20 having an opening in the upper end thereof. A porous polypropylene (PP) material was used for the bag-like insulating member 20, and the average pore diameter thereof was roughly about 15 μm. Subsequently, the wound electrode body 80 was housed in the battery case body 52 together with the bag-like insulating member 20, and the opening of the battery case body 52 was sealed with the cover 54 by welding. Both the battery case body 52 and the cover 54 were made of aluminum, the dimensions of the battery case body 52 were 150 mm across×30 mm wide×100 mm high, and the dimensions of the cover 54 were 150 mm across×30 mm wide×3 mm thick (plate thickness). A battery for evaluation prior to injecting an electrolyte solution (Example 1) was constructed in this manner.

In addition, a battery for evaluation in which the bag-like insulating member 20 was not used was produced as Comparative Example 1. Namely, in Comparative Example 1, the wound electrode body 80 was housed directly in the battery case 50 without interposing the bag-like insulating member 20 there between (without inserting into the bag-like insulating member 20). The battery for evaluation relating to Comparative Example 1 was produced under the same conditions as Example 1 with the exception of not using the bag-like insulating member 20. In addition, a battery for evaluation was produced using a non-porous bag-like insulating member as Comparative Example 2. Namely, a battery for evaluation was produced for use as Comparative Example 2 by using an insulating member made of non-porous polypropylene (PP) in which pores were not formed. The battery for evaluation relating to Comparative Example 2 was produced under the same conditions as Example 1 with the exception of using a non-porous insulating member.

The presence or absence of uneven electrolyte permeation was investigated by injecting electrolyte solution into the batteries for evaluation relating to Example 1 and Comparative Examples 1 and 2 produced in the manner described above. In addition, copper particles were placed in the battery case 50 in advance of injecting the electrolyte solution to confirm whether or not the copper particles entered the wound electrode body during injection of the electrolyte solution. Two types of commercially available copper powder having mutually different particle diameters were used (1 g of a mixture of copper powder consisting of CE-8A and FCC-115 manufactured by Fukuda Metal Foil & Powder Co., Ltd. mixed at a ratio of 8:2, see Table 2). The electrolyte solution was injected by repeatedly depressurizing and opening to atmospheric pressure the inside of the battery case 50 three times in order to promote permeation of the electrolyte solution, followed by injecting the electrolyte solution through the liquid injection port 62 in the cover 54. After injecting the electrolyte solution and allowing to stand in that state for 1 hour, the wound electrode body 80 was removed from the battery case 50 and disassembled followed by measuring the quantity and particle size of copper powder that had entered between the positive electrode sheet 82 and the negative electrode sheet 84. In addition, uneven permeation of electrolyte solution into the wound electrode body 80 was also confirmed visually. Those results are shown in Table 1.

average particle diameter of 15 μm or more, and particularly copper powder larger than the thickness of 25 μm of the porous separator sheets). In addition, in the batter relating to Comparative Example 2, although there was no contamination by copper powder, uneven permeation of electrolyte solution was confirmed to a degree that was able to be determined visually. On the basis of these results, the use of the bag-like insulating member 20 made of a porous material was confirmed to secure permeability of electrolyte solution while also being able to prevent contamination of the electrode body by foreign objects.

Although partially duplicating the previous explanation, the following provides a description of the composite materials of the electrode body 80 and the electrolyte solution relating to the present embodiment with reference to FIG. 2. The positive electrode sheet 82 is formed by applying a positive electrode active material layer for a lithium ion battery onto a long positive electrode current collector. Aluminum foil (which is used in the present embodiment) or other metal foil suitable for a positive electrode is preferably used for the positive electrode current collector. One type or two or more types of a substance conventionally used in lithium ion batteries can be used without any particular limitations for the positive electrode active material. Preferable examples thereof include $LiMn_2O_4$, $LiCoO_2$ and $LiNiO_2$. For example, a preferable positive electrode sheet 82 is obtained by using an aluminum foil for the current collector having a length of about 2 to 4 m (for example, 2.7 m), a width of about 8 to 12 cm (for example, 10 cm) and a thickness of about 5 to 20 μm (for example, 15 μm), and forming a positive electrode active material layer for a lithium ion battery consisting mainly of lithium nickel oxide (consisting of, for example, 88% by

TABLE 1

| Sample | Foreign Object Contamination | | | | | | Uneven electrolyte solution permeation |
|---|---|---|---|---|---|---|---|
| | Up to 5 μm | Up to 10 μm | Up to 15 μm | Up to 30 μm | Up to 50 μm | Up to 100 μm | |
| Example 1 | 5 | 3 | 0 | 0 | 0 | 0 | ○ (Absent) |
| Comp. Ex. 1 | 22 | 26 | 11 | 6 | 4 | 1 | ○ (Absent) |
| Comp. Ex. 2 | 0 | 0 | 0 | 0 | 0 | 0 | X (Present) |

TABLE 2

| Product No. | Apparent density (g/cm3) | Fluidity (s/50 g) | Particle size distribution (mass %) | | | | | | |
|---|---|---|---|---|---|---|---|---|---|
| | | | +180 μm | +150 μm | +106 μm | +75 μm | +63 μm | +45 μm | −45 μm |
| CE-8A | 1.6-1.9 | <50 | — | <3 | 5-15 | 20-35 | 10-25 | 10-30 | 15-30 |
| FCC-115 | 0.7-1.2 | — | — | — | — | — | <2 | <10 | >90 |

As shown in Table 1, in the battery relating to Example 1, there was no contamination by copper powder having an average particle diameter of 15 μm or more, and there was confirmed to be no contamination by copper powder that was larger than the thickness of 25 μm of the porous separator sheets in particular (copper powder able to cause an internal short-circuit of the wound electrode body 80). In addition, favorable results were also obtained for uneven permeation of electrolyte solution. In contrast, in the battery relating to Comparative Example 1, although there was no uneven permeation of electrolyte solution, there was contamination by a large amount of copper powder (copper powder having an weight of lithium nickel oxide, 10% by weight of acetylene black, 1% by weight of polytetrafluoroethylene and 1% by weight of carboxymethyl cellulose) at a prescribed region on the surface thereof in accordance with ordinary methods.

On the other hand, the negative electrode sheet 84 can be formed by applying a negative electrode active material layer for a lithium ion battery onto a long negative electrode current collector. Copper foil (which is used in the present embodiment) or other metal foil suitable for a negative electrode is preferably used for the negative electrode current collector. One type or two or more types of a substance conventionally used in lithium ion batteries can be used without any particular limitations for the negative electrode active material. Preferable examples thereof include carbon-based materials such as graphite carbon or amorphous carbon, lithium-containing transition metal oxides and transition metal nitrides. For example, a preferable negative electrode sheet 84 is obtained by using a copper foil having a length of about 2 to 4 m (for example, 2.9 m), a width of about 8 to 12 cm (for example, 10 cm) and a thickness of about 5 to 20 μm (for example, 10 μm), and forming a negative electrode active material layer for a lithium ion battery consisting mainly of graphite (consisting of, for example, 98% by weight of graphite, 1% by weight of styrene butadiene rubber and 1% by weight of carboxymethyl cellulose) at a prescribed region on the surface thereof in accordance with ordinary methods.

In addition, an example of a preferable separator 86 used between the positive and negative electrode sheets 82 and 84 is the one made of a porous polyolefin-based resin. For example, a porous separator sheet can be used preferably that is made of a synthetic resin (for example, a polyolefin such as polyethylene) having a length of about 2 to 4 m (for example, 3.1 m), a width of about 8 to 12 cm (for example, 11 cm) and a thickness of about 5 to 30 μm (for example, 25 μm). Furthermore, the electrode body housed in the battery case is not limited to a wound type as described above. For example, the electrode body may be a laminated type of electrode body that is obtained by alternately laminating the positive and negative electrode sheets and the separator.

A non-aqueous electrolyte solution in which, for example, an electrolyte is dissolved in a non-aqueous solvent, can be used for the electrolyte solution. Examples of the non-aqueous solvent that can be used include one type or two or more types selected from the group consisting of ethylene carbonate, propylene carbonate, dimethyl carbonate (DMC), diethyl carbonate, ethyl methyl carbonate (EMC), 1,2-dimethoxyethane, 1,2-diethoxyethane, tetrahydrofuran and 1,3-dioxolane. In addition, one type or two or more types selected from the group consisting of various types of lithium salts having fluorine as a constituent element thereof can be used for the electrolyte (supporting salt). For example, one type or two or more types selected from the group consisting of $LiPF_6$, $LiBF_4$, $LiAsF_6$, $LiCF_3SO_3$, $LiC_4F_9SO_3$, $LiN(CF_3SO_2)_2$ and $LiC(CF_3SO_2)_3$ can be used.

Although the above has provided an explanation of the present invention through a preferable embodiment thereof, this description is not intended to be limiting, and various modifications can naturally be made. For example, although the insulating member 20 has the shape of a bottomed box (bag) in which the upper end thereof is open, it may also be a bag in which the upper end is not open. Namely, the bag-like insulating member 20 may be used in which the upper open end 22 is sealed so as to completely cover the periphery of the wound electrode body 80, including the upper surface thereof. As a result, the entire electrode body 80 can be completely covered with the insulating member 20. As a result of covering the entire electrode body 80 with the bag-like insulating member 20 in this manner (covering the electrode body 80 so that the electrode body 80 housed in the bag-like insulating member 20 is not exposed outside the bag-like insulating member 20), entrance of foreign objects into the electrode body 80 can be more reliably prevented.

In addition, the type of battery is not limited to the above-mentioned lithium ion secondary battery, but rather may also be a battery of various contents having different electrode body constituent materials and electrolytes, examples of which include a nickel hydrogen battery, nickel cadmium battery and an electric double-layer capacitor (namely, a physical battery).

Figure 6:
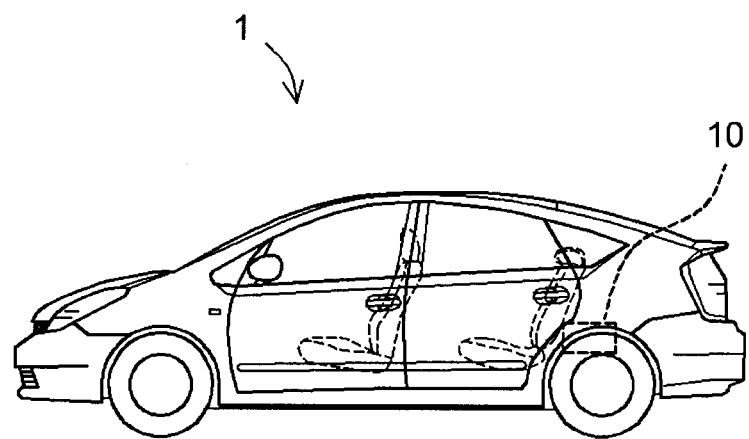
FIG. 6 is a side view schematically showing a vehicle (automobile) provided with a battery relating to an embodiment of the present invention.

As shown in FIG. 6, the battery provided by the present invention can be preferably used particularly as a power supply for a motor installed in a vehicle such as an automobile. Namely, together with using the battery relating to the present invention as a single-cell battery, a plurality of the batteries can be arranged in a prescribed direction in a state in which they are electrically connected, and the plurality of single-cell batteries can be bound in the direction in which they are arranged to construct a battery pack 10. Thus, according to the present invention, a vehicle 1 (and typically, an automobile, and particularly an automobile provided with a motor in the manner of a hybrid automobile, electric automobile or fuel cell automobile) can be provided that is provided with the battery pack (namely, the battery relating to the present invention) 10 as a power supply.

INDUSTRIAL APPLICABILITY

According to the configuration of the present invention, a battery can be provided that is provided with an insulating member that insulates a battery case and an electrode body and is able to secure good injection performance of an electrolyte solution.

The invention claimed is:

1. A battery, comprising:
    a wound electrode body in which a sheet-like positive electrode and a sheet-like negative electrode are wound;
    a battery case that houses the wound electrode body together with an electrolyte solution; and
    an insulating member that isolates the wound electrode body from the battery case, the insulating member being arranged between the wound electrode body and the battery case, wherein
    the insulating member forms a bag shape and is sealed to completely cover the wound electrode body, and wherein the insulating member is made of a porous material having pores through which the electrolyte solution is able to flow, and
    an average pore diameter of the insulating member is 0.1 μm to 25 μm.

2. The battery according to claim 1, wherein the wound electrode body is provided with a separator interposed between the positive and negative electrodes, and
    the average pore diameter of the insulating member is less than a thickness of the separator.

3. The battery according to claim 2, wherein the separator is a porous separator, and
    the average pore diameter of the insulating member is larger than an average pore diameter of the porous separator.

4. The battery according to claim 2, wherein the average pore diameter of the insulating member is about one-half the thickness of the separator.

5. The battery according to claim 2, wherein the average pore diameter of the insulating member is 0.1 μm to 15 μm.

6. A vehicle, comprising the battery according to claim 1.

7. The battery according to claim 1, wherein the battery is a lithium ion secondary battery.

* * * * *